US005338240A

United States Patent [19]

Kim

[11] Patent Number: 5,338,240

[45] Date of Patent: Aug. 16, 1994

[54] METHOD OF MAKING A LIQUID CRYSTAL DISPLAY

[75] Inventor: Jin Young Kim, Daegu, Rep. of Korea

[73] Assignee: Gold Star Co., Ltd., Seoul, Rep. of Korea

[21] Appl. No.: 913,417

[22] Filed: Jul. 15, 1992

[30] Foreign Application Priority Data

Jul. 15, 1991 [KR] Rep. of Korea ........................ 12025

[51] Int. Cl.[5] ........................ G02F 1/1339; H04N 9/30

[52] U.S. Cl. ........................................ 445/24; 430/20; 359/68; 359/81

[58] Field of Search ...................... 445/24, 25; 359/81, 359/68; 430/20

[56] References Cited

U.S. PATENT DOCUMENTS

| | | | |
|---|---|---|---|
| 4,341,445 | 7/1982 | Matsuyama et al. | 359/81 X |
| 4,568,149 | 2/1986 | Sugata et al. | 359/81 X |
| 4,869,576 | 9/1989 | Aoki et al. | 359/68 X |
| 5,093,738 | 3/1992 | Watanabe | 359/68 |
| 5,122,891 | 6/1992 | Kim | 359/68 X |

FOREIGN PATENT DOCUMENTS

| | | | |
|---|---|---|---|
| 98634 | 4/1988 | Japan | 430/20 |
| 113424 | 5/1988 | Japan | 359/81 |
| 20718 | 1/1991 | Japan | 359/81 |
| 14021 | 1/1992 | Japan | 359/81 |

*Primary Examiner*—Kenneth J. Ramsey

*Attorney, Agent, or Firm*—Keck, Mahin & Cate

[57] ABSTRACT

A method of making a light-influencing liquid crystal display wherein no spacers are placed in the display regions, in order to improve the contrast of the liquid crystal display. The method comprises the steps of preparing a first and second substrate, forming a first plurality of pixel electrodes on the first substrate, forming a plurality of thin film transistors (TFT) on the first substrate, forming a second plurality of pixel electrodes on the second substrate, forming a plurality of black stripes and spacers on the second substrate in a predetermined pattern, securing the substrates together with the first plurality of electrodes facing the second plurality of electrodes and with the spacers between the substrates, and applying light-influencing display material between the substrates.

2 Claims, 3 Drawing Sheets

METHOD OF MAKING A LIQUID CRYSTAL DISPLAY

FIELD OF THE INVENTION

The present invention relates generally to a method of making a liquid crystal display, and more particularly to a method of making a light-influencing liquid crystal display wherein no spacers are placed in the display regions, in order to improve the contrast of the liquid crystal display.

TECHNICAL BACKGROUND

Generally, various kinds of liquid crystal display have been developed. One common form of display is a light-influencing liquid crystal display. This type of liquid crystal display comprises a pair of substrates 2a and 2b, facing each other but not in contact with each other, as shown in FIG. 1. These substrates are usually formed of glass. The lower substrate 2a has a plurality of first light-transmissive pixel electrodes 3a formed thereon. The first light-transmissive pixel electrodes 3a may be formed by depositing light-transmissive conductive material such as indium tin oxide on the entire upper surface of the lower substrate 2a and then removing selected portions of the deposited material by utilizing a suitable mask and conventional photolithography techniques. An alignment layer 4a of polyimide is formed over the first light-transmissive pixel electrodes 3a and lower substrate 2a. In addition, a plurality of spacers 6 is formed on the alignment layer 4a. The alignment layer 4a and spacers 6 are formed by applying liquid alignment material containing inorganic material such as glass fiber and $Al_2O_3$ onto the first light transmissive pixel electrodes 3a and lower substrate 2a by using a roller, as shown in FIG. 2A. The spacers 6 are embedded in the alignment layer 4a, creating a protrusion.

The alignment layer 4a and spacers 6 may also be formed in another way, as follows. First the alignment material is applied onto the first light-transmissive pixel electrodes 3a and lower substrate 2a by using a roller so as to form the alignment layer 4a. Then inorganic material such as $Al_2O_3$ and glass fiber mixed with volatile or viscous liquid is scattered over the alignment layer 4a so as to make the spacers 6 attached to the alignment layer 4a, as shown in FIG. 2B.

Additionally, on the upper substrate 2b is deposited conductive light-transmissive material such as indium tin oxide that is patterned to form a common electrode or a second plurality of light-transmissive pixel electrodes 3b by utilizing a suitable mask and conventional photolithography techniques. Liquid alignment material of polyimide is applied to the upper substrate 2b with the second light-transmissive electrodes 3b by using a roller to form another alignment layer 4b.

After rubbing the entire surface of the lower substrate 2a having the first light transmissive pixel electrodes 3a, the first alignment layer 4 and the spacers 6 and rubbing the entire surface of the upper substrate having the second light-transmissive electrodes 3b and the second alignment layer 4b by using a soft cloth such as veludo, the upper and lower substrates 2a and 2b are printed with epoxy and then combined and scribed. Twisted nematic liquid crystal 5 is injected between the scribed substrates, which are then sealed. Thereafter, polarizing plates 1a and 1b are respectively attached to the outsides of the upper and lower substrates 2a and 2b with the offset angle of the incident light absorption axes being 0°. If no electric field is applied to such a light-influencing liquid crystal display, it remains in a dark state because the molecules of the liquid crystal lie parallel with the substrates. On the contrary, when an electric field is applied to it, it transmits light because the molecules of the liquid crystal stand upright.

When forming the alignment layer 4a and spacers 6 by applying the mixture of liquid alignment material and spacers onto the lower substrate 2a with the first light-transmissive electrodes 3a, the spacers 6 are randomly scattered over the entire surface of the lower substrate 2a so that they may be positioned in the display regions or even cover the first light-transmissive pixel electrodes 3a. This causes the light rays entering through the polarizing plate 1a, lower substrate 2a and first light-transmissive pixel electrodes 3a to be scattered by the spacers 6 positioned in the display regions, thus considerably degrading the contrast. Further, the alignment layer 4a of organic material has a thickness not uniformly formed and also has pin holes owing to the surface tension and coalescing force between the alignment layer 4a and spacers 6. Moreover, the spacers 6 become often detached and broken during the rubbing so that the distance between the upper and lower substrates 2a and 2b may not remain uniform and the alignment layer 4a may be damaged, producing defects such as pin holes.

Meanwhile, when sequentially forming the alignment layer 4a and spacers 6, the spacers 6, mixed with volatile or viscous liquid, are randomly scattered over the lower substrate 2a with the first light-transmissive electrodes 3a, so that the spacers 6 may be placed in the display regions. This causes the light rays entering through the polarizing plate 1a, lower substrate 2a and first light-transmissive pixel electrodes 3a to be scattered by the spacers 6 positioned in the display regions, thus considerably degrading the contrast. In addition, since the vacuum adsorbing for removing dusts is performed prior to forming the alignment layer 4a, the dusts introduced during the formation of the alignment layer 4a and spacers 6 make the distance between the upper and lower substrates 2a and 2b not uniform.

As a result, in the light-influencing liquid crystal display produced according to conventional methods, the distance between the glass substrates is not uniform and the spacers are placed in the display regions, thus considerably degrading the contrast.

SUMMARY OF THE INVENTION

The object of the present invention is to provide a method of making a liquid crystal display that has a uniform thickness and no spacers placed in the display regions.

According to the present invention, the method of making a light-influencing liquid crystal display comprises the steps of preparing a first and second substrate, forming a first plurality of pixel electrodes on the first substrate, forming a plurality thin film transistors(TFT) on the first substrate, forming a second plurality of pixel electrodes on the second substrate, forming a plurality of black stripes and spacers on the second substrate in a predetermined pattern, securing the substrates together with the first plurality of electrodes facing the second plurality of electrodes and with the spacers between the substrates, and applying light-influencing display material between the substrates.

The present invention will now be described more specifically with reference to the attached drawings.

BRIEF DESCRIPTION OF THE ATTACHED DRAWINGS

DETAILED DESCRIPTION OF A CERTAIN PREFERRED EMBODIMENT

Figure 1:
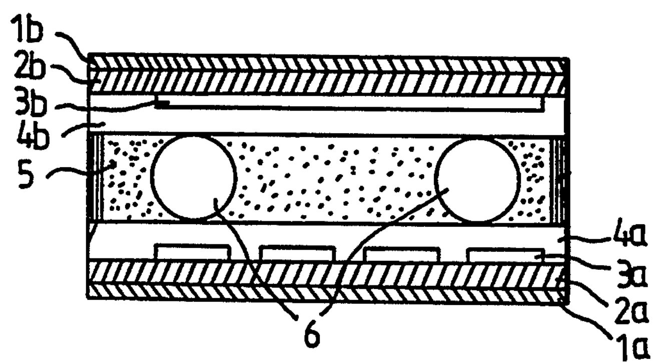
FIG. 1 is a cross sectional view of a light-influencing liquid crystal display made by a conventional method.
Figure 2A:
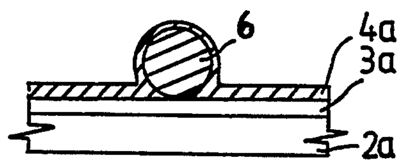
FIGS. 2A and 2B are cross sectional views of the spacers formed on the alignment layers.
Figure 2B:
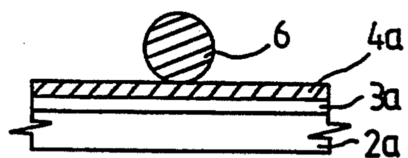
Figure 3:
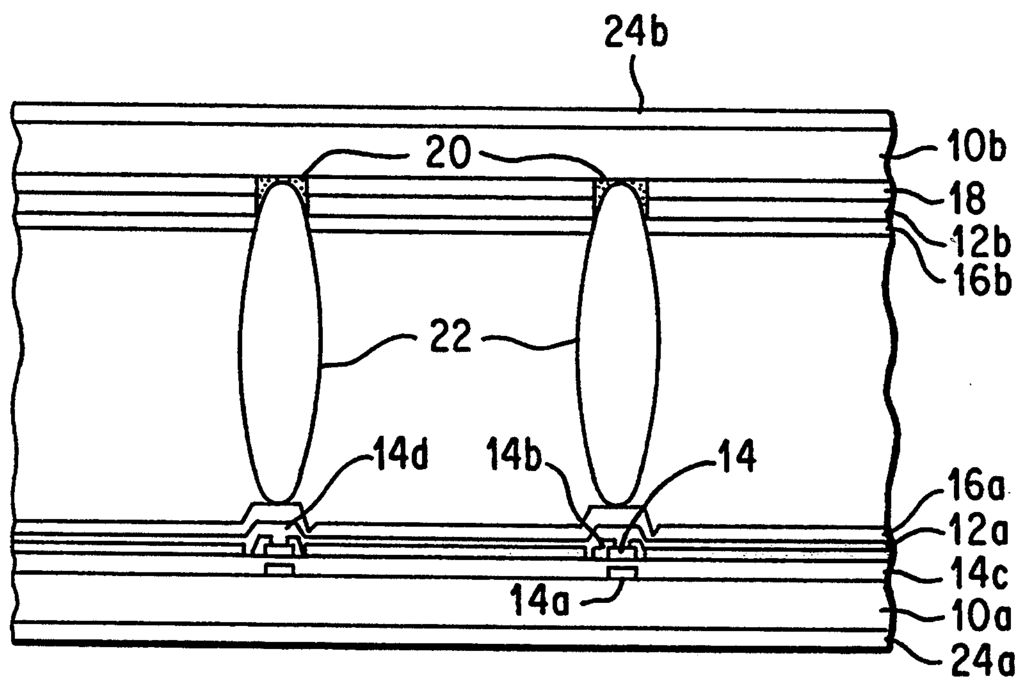
FIG. 3 is a cross sectional view of a liquid crystal display made by the method of this invention.
Figure 4:
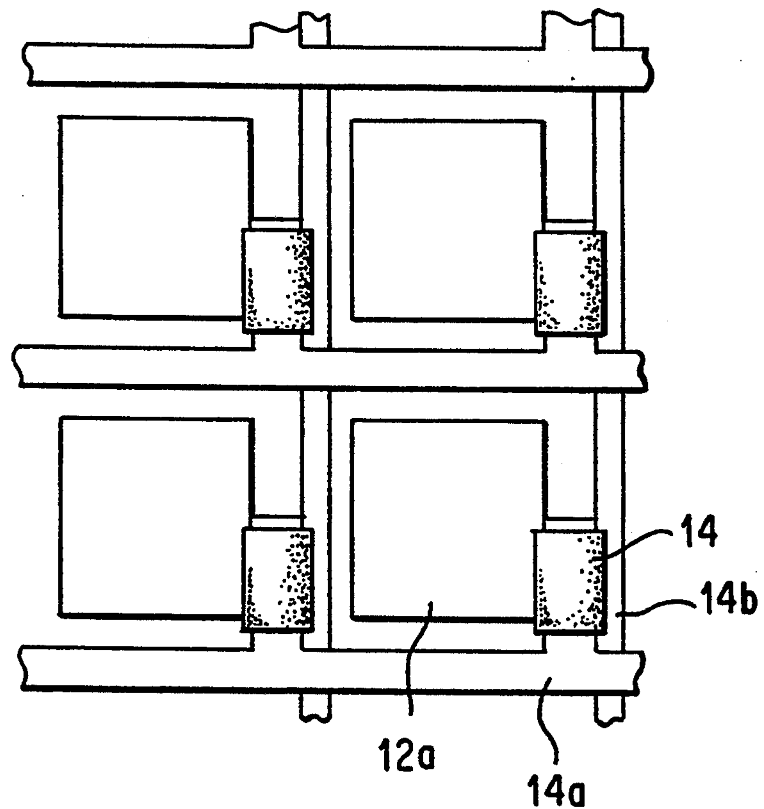
FIG. 4 is a pattern of gate bus line, source bus line, TFT and first light-transmissive pixel electrodes formed on the lower glass substrate.

Referring to FIG. 3, a light-influencing liquid crystal display including a pair of glass substrates 10*a* and 10*b* for supporting electrodes is shown. On the entire upper surface of the lower substrate 10*a* are formed a first plurality of light transmissive pixel electrodes 12*a* and a plurality of thin film transistors (TFTs) 14. The TFTs 14 are arranged in a matrix and connected with gate buslines 14*a* and source bus lines 14*b*. FIG. 4 shows the first plurality of light-transmissive pixel electrodes 12*a*, TFTs 14 and gate and source bus lines 14*a* and 14*b*.

Referring to FIGS. 3 and 4, the gate bus lines 14*a* are formed by applying metallic material to the lower glass substrate 10*a* and then utilizing a suitable mask and conventional photolithography techniques. An insulating layer 14*c* is deposited on the entire upper surface of the lower glass substrate 10*a* including the gate bus lines 14*a*. The TFTs 14 are formed by applying amorphous silicon to the insulating layer 14*c* and then utilizing a suitable mask and conventional photolithography techniques. Thereafter, the first plurality of light-transmissive pixel electrodes 12*a* and source bus lines 14*b* are sequentially formed by applying metallic material to the entire surface and then utilizing a suitable mask and conventional photolithography techniques. Another insulating layer 14*d* is deposited on the first plurality of light-transmissive pixel electrodes 12*a*, source bus lines 14*b* and TFTs 14. The first light transmissive pixel electrodes 12*a* may be formed of indium tin oxide (hereinafter referred to as ITO).

The light-influencing liquid crystal display further includes an alignment layer 16*a* deposited on the insulating layer 14*d*. The alignment layer 16*a* is formed by applying a liquid alignment material of polyimide.

The upper glass substrate 10*b* has a color filter 18 formed on the upper surface. A second plurality of light-transmissive pixel electrodes or common electrode 12*b* are formed on the color filter 18. The second light-transmissive pixel electrodes 12*b* are formed by applying light-transmissive metallic material to the upper surface of the color filter 18 and then utilizing a suitable mask and conventional photolithography techniques. The pattern of the second light-transmissive pixel electrodes 12*b* is defined by cross-shaped grooves so as to form a plurality of square electrodes connected with each other.

Figure 5A:
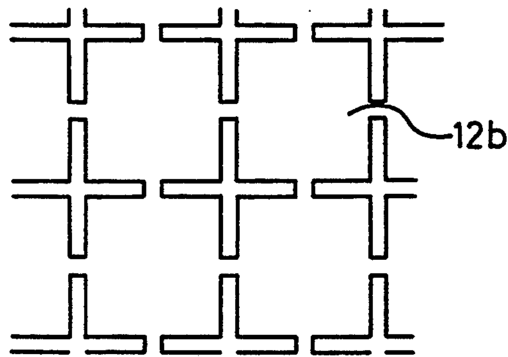
FIG. 5A is a pattern of second light-transmissive electrodes formed on the upper glass substrate.
Figure 5B:
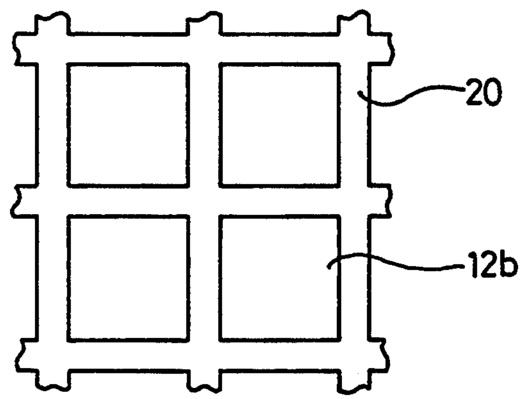
FIG. 5B is a pattern of black stripes formed on the upper glass substrate.

Formed in the cross-shaped grooves of the second plurality of light-transmissive pixel electrodes 12*b* are spacers 22 and black stripes 20, i.e. the non-display region in a matrix. The pattern of the black stripes 20 is shown in FIG. 5B. The black stripes 20 and spacers 22 are formed together as follows:

The liquid used to form the black stripes is mixed with an inorganic material such as glass fiber and $Al_2O_3$, and then applied to the entire upper surface of the upper glass substrate 10*b* with the second light-transmissive pixel electrodes 12*b*. The deposited black stripe-forming liquid is patterned by utilizing a suitable mask and conventional photolithography techniques as shown in FIG. 5B. The black stripes 20 have protruding spacers 22 formed of an inorganic material such as glass fiber and $Al_2O_3$.

Figure 5C:
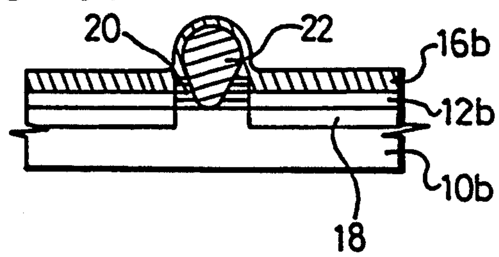
FIG. 5C is a cross sectional view of a spacer formed in the region of the black stripes.

An alignment layer 16*b* is formed over the second light-transmissive pixel electrodes 12*b*, black stripes 20 and spacers 22 by applying a liquid organic material such as polyimide by means of a roller. FIG. 5C shows the spacers 22 positioned in the black stripes 20.

The lower glass substrate 10*a*, which includes the first plurality of light-transmissive pixel electrodes 12*a*, TFTs 14 and alignment layer 16*a*, and the upper glass substrate 10*b*, which includes the black stripes 20, spacers 22 and alignment layer 16*b*, are rubbed with a soft cloth and then combined to form a liquid crystal display. A pair of polarizing plates 24*a* and 24*b* are attached to the outsides of the lower and upper substrates 10*a* and 10*b*, respectively, with an offset angle of 0°.

Referring to FIG. 3, a light-influencing material 26 such as twisted nematic liquid crystal is injected between the two alignment layers 16*a* and 16*b*, which are then sealed. When an electric field is applied between the first and second light-transmissive pixel electrodes 12*a* and 12*b*, the molecules of the liquid crystal 26 are aligned vertically towards the first and second light-transmissive pixel electrodes so as to transmit light rays from the polarizing plate 24*a* to the polarizing plate 24*b*. On the contrary, when an electric field is not applied between the first and second light-transmissive pixel electrodes 12*a* and 12*b*, the molecules of the liquid crystal 26 are aligned parallel to the first and second electrodes 12*a* and 12*b* so as to reflect back the light rays entering through the polarizing plate 24*a*.

As stated above, the present invention provides a liquid crystal display, whose contrast is considerably improved by positioning the spacers in the black stripes, i.e. the non-display region. In addition, since the spacers are not formed with the alignment layer, the alignment layer is protected from being damaged by the production of pin holes or of an irregular thickness.

What is claimed is:

1. A method of making a light-influencing liquid crystal display, comprising the steps of:
   - preparing a first substrate and a second substrate;
   - forming a first plurality of pixel electrodes on said first substrate;
   - forming a plurality of thin film transistors on said first substrate;
   - forming a color filter layer on said second substrate;
   - forming a second plurality of pixel electrodes on said color filter layer;
   - forming a plurality of black stripes and spacers on said second substrate in a predetermined pattern by forming a plurality of mixtures of said black stripes and spacers in grooves said second pixel electrodes on said second substrate and patterning said formed mixtures by utilizing a mask and a photolithography process;

securing said substrates together with said first plurality of electrodes facing said second plurality of electrodes and with said spacers between said substrates; and applying a light-influencing display material between said substrates.

2. A method of making a light-influencing liquid crystal display, comprising the steps of:

preparing a first glass substrate and a second glass substrate;

forming a plurality of gate electrodes of thin film transistors on said first substrate;

coating said first substrate and plurality of said gate electrodes with an insulating layer;

forming a plurality of said thin film transistors, source electrodes of said think film transistors and first light-transmissive pixel electrodes on said insulating layer;

coating said plurality of said thin film transistors, source electrodes and light-transmissive pixel electrodes with a first alignment layer;

forming a color filter layer on said second substrate;

forming a plurality of second light-transmissive pixel electrodes on said color filter layer;

forming a plurality of black stripes and spacers in non-display regions of said second substrate by forming a plurality of mixtures of said black stripes and spacers in grooves said second pixel electrodes on said second substrate and patterning said formed mixtures by utilizing a mask and a photolithography process;

coating said plurality of second pixel electrodes, black stripes and spacers with a second alignment layer;

laminating said first substrate and said second substrate; and applying a liquid crystal material between said first substrate and said second substrate.

* * * * *